United States Patent [19]

Herrick

[11] 4,053,038
[45] Oct. 11, 1977

[54] SELF-SYNCHRONIZING CLUTCH

[75] Inventor: Rolland Clyde Herrick, Ambler, Pa.

[73] Assignee: Philadelphia Gear Corporation, King of Prussia, Pa.

[21] Appl. No.: 713,646

[22] Filed: Aug. 12, 1976

[51] Int. Cl.² ........................................... F16D 23/10
[52] U.S. Cl. ........................... 192/67 A; 192/109 D
[58] Field of Search ........................ 192/67 A, 109 D

[56] References Cited

U.S. PATENT DOCUMENTS

| 2,972,397 | 2/1961 | Sinclair | 192/67 A |
|---|---|---|---|
| 3,008,560 | 11/1961 | Short | 192/67 A |
| 3,189,148 | 6/1965 | Sinclair et al. | 192/67 A |
| 3,203,526 | 8/1965 | Clements | 192/67 A |
| 3,333,663 | 8/1967 | Clements | 192/67 A |
| 3,402,794 | 9/1968 | Sinclair et al. | 192/67 A |

Primary Examiner—Allan D. Herrmann

Attorney, Agent, or Firm—Paul & Paul

[57] ABSTRACT

A self-synchronizing clutch has two sets of helical splines. A first set is between the main input shaft and a carrier member. The second set is between the carrier member and a coupling member. The second set of splines performs the indexing function. A one-way or over-running clutch is included as a sensing means but does not perform the indexing function. The over-running clutch or sensing means provides the small torque needed to shift angularly the carrier and coupling members on their respective helical splines. Constraining means, activated by the sensing means, is provided for the carrier member. Spring-loaded biasing means are provided for the carrier member in those installations where the input shaft occupies, or may occupy, a tilted or inclined position. A clutch lock-in and/or clutch lock-out means are also provided.

19 Claims, 7 Drawing Figures

SELF-SYNCHRONIZING CLUTCH

BACKGROUND OF THE INVENTION

This invention relates to clutches for transmitting rotary motion.

More particularly, the invention relates to clutches of the synchronous self-shifting type.

Still more particularly, the invention relates to self-synchronizing clutches which will automatically couple the load to the engine shaft when the speed of the engine shaft overtakes the speed of the load and which will automatically decouple the load from the engine shaft when the engine shaft runs slower than the load.

Prior art clutches of the self-synchronizing type have required indexing means to effect engagement of the main clutch components. Typically, in prior art clutches, indexing is achieved by a pawl and ratchet mechanism which is used to line up the engaging teeth of the main load-carrying members or of a secondary toothed clutch which in turn lines up and engages the main load carrying members. Such use of pawls for indexing decreases the reliability of the clutch mechanism since any wear or damage that may be sustained on the ends of the pawl may cause malfunctioning of the clutch.

SUMMARY OF THE INVENTION

A principal object of the present invention is to provide a self-synchronizing clutch so designed that the use of pawls for indexing and tooth engagement is avoided.

The foregoing object is achieved, in accordance with the present invention by so designing the clutch mechanism that helical splines perform the indexing or tooth aligning function.

In a preferred embodiment of the invention, illustrated and described herein, a pawl and ratchet device may be incorporated into the clutch mechanism as shown herein, but the only function of the pawls is to sense that the speed of the input shaft is approaching that of the load, and, upon pawl engagement, to transmit the small torque necessary to initiate engagement of the main load-carrying members by means of the tooth-seeking helical splines. It is to be particularly noted that in this mechanism, pawls do not provide the indexing for the main load-carrying members, and that such indexing is performed by helical splines. Thus, any wear or damage that may be sustained by the pawls will not prevent indexing and engagement of the main coupling elements.

A further advantage of avoiding the use of pawls to effect engagement of the main load-carrying members is that it is not necessary to hold the relative angular positions of engaging splines to critical tolerances. To the contrary, it is possible to manufacture the clutch of the present invention with random positioned splines on parts. This is not possible in prior-art self-synchronizing clutches.

The present invention provides a self-synchronizing clutch that may be installed either in-line or over-hung (on a quill shaft) between the input shaft from the power source and the load. The new clutch will automatically couple the load to the power-source shaft when the speed of the power-source shaft overtakes the load speed, and the clutch will release as soon as the power-source shaft runs slower than the load. The action is automatic. No controls are required. Moreover, no external force or power is required to keep the splined load-carrying members engaged or disengaged. This is accomplished by the presence or lack of transmitted torque.

DESCRIPTION OF THE PREFERRED EMBODIMENTS

Figure 1:
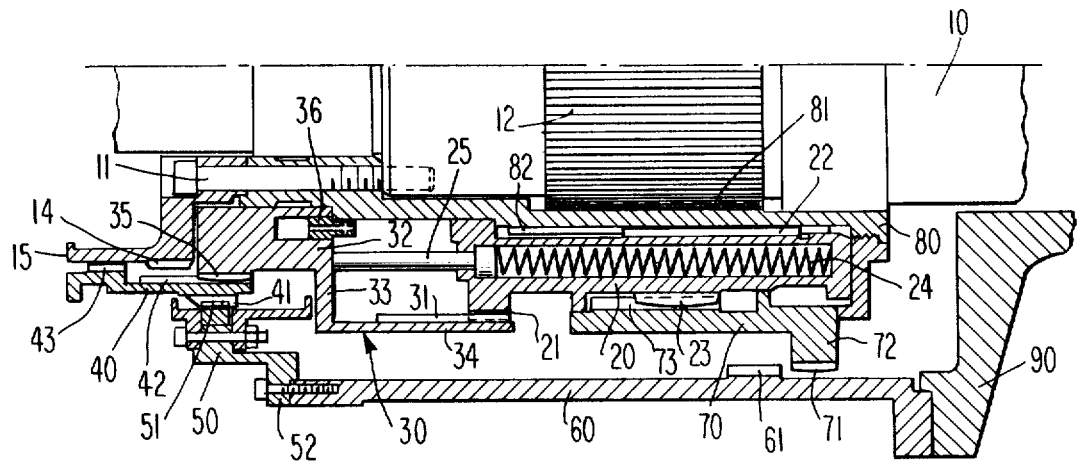
FIG. 1 is a view, in longitudinal section on one side only of the longitudinal center line, of a clutch mechanism according to the present invention showing the clutch in fully disengaged position.

Referring now to FIG. 1, two main members are shown, identified as 10 and 90. The first main member 10 is an input shaft which is connected to a first power source, not shown. The second main member 90 is an output flange which is connected to the load. The load is usually, although not always, connected to and driven by a second power source, not shown. In any event, main member 90 is being moved rotationally by a torque.

Figure 6:
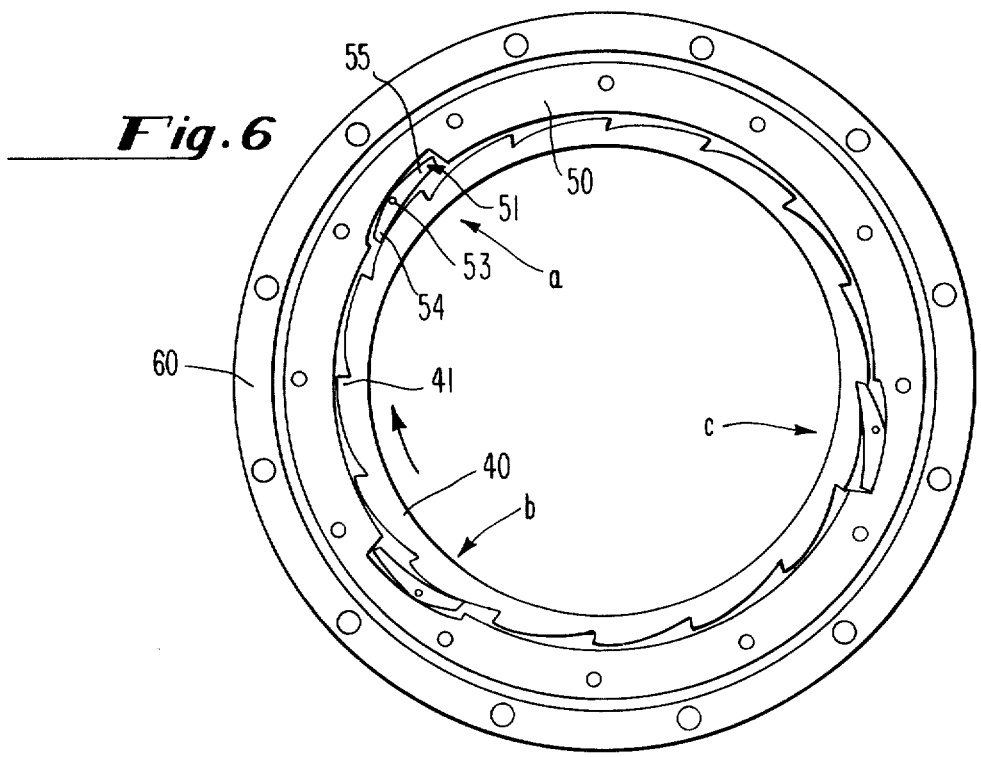
FIG. 6 is a view, in transverse cross-section, showing a pawl and ratchet mechanism of a type which may be used in the clutch of the present application to sense that the speed of the input shaft has attained that of the load and, upon the resultant pawl engagement, to transmit a small torque to initiate movement of the carrier and the coupler into positions to effect coupling of the main load-carrying members.

Reference numeral 50 identifies a pilot clutch which may preferably, but not necessarily, be of the pawl-and-ratchet type. Such known type of pawl-and-ratchet pilot clutch is illustrated in FIG. 6. It is emphasized that a pawl-and-ratchet type of pilot clutch is not essential to the present invention and that any generalized over-running clutch with sufficient capability may be satisfactorily used as the pilot clutch.

The pawl-and-ratchet type of pilot clutch, while not essential, is a preferred form of pilot clutch because it assures positive one-way no-slip action. The particular clutch illustrated in FIG. 6, shows three pawls 51 mounted in an output ring 50 which, as shown in FIG. 1, is bolted to or otherwise connected to an output sleeve or cup 60. Pawls 51 are mounted loose in their sockets so that they can rock about a fulcrum 53. The pawls are designed to be slightly tail heavy and/or spring biased so that centrifugal force will bias the tail 55 outward and the nose 54 inward against the ratchet teeth 41 of ring 40. To prevent wear, a hydrodynamic oil film is created between the pawls 51 and the ratchet teeth 41. In FIG. 6, at c the pawl is shown to be fully engaged, driving ring 50 clockwise. At a and b, the pawls are shown not engaged.

In operation, both of the rings 40 and 50 are rotated in the same direction, clockwise as viewed in FIG. 6. As will be evident, from FIG. 6, engagement or non-engagement of the pawls 51 with the ratchet teeth 41 depends upon the direction of relative motion between rings 40 and 50 which, in turn, depends upon the relative speeds of the two rings. If ring 40 is rotating clockwise at a rate of speed faster than ring 50, the ratchet teeth 41 will engage the nose 54 of the pawls 51 and ring 40 will drive ring 50. As a result, there will be no relative motion thereafter between the two rings. On the other hand, if ring 50 is rotating clockwise at a rate of speed faster then that of ring 40, the pawls 51 will merely ride over the ratchet teeth 41, without engagement, and there will be relative motion between the rings 40 and 50.

In the particular design of the pilot clutch illustrated in FIG. 6, three pawls and 16 ratchet teeth are used to provide 48 points of engagement per relative revolution. Thus, if a pawl just misses engaging a ratchet tooth, relative motion of only one-forty-eighth of a revolution occurs before engaging the next ratchet. Such a small relative angle reduces the inpact upon pawl engagement and is a highly desirable feature, particularly in the case of a rapidly accelerating engine. It is to be understood, of course, that a different number of pawls than three and a different number of ratchet teeth than 16 may be employed. The arrangement illustrated in FIG. 6 is merely one combination for a particular design.

In the particular design of pilot clutch shown in FIG. 6 the ring 40 also functions as a lock ring. This feature is not essential, but useful. It will be realized that there are occasions when it is necessary or desirable to accelerate the main engine or other power source which drives the main input shaft 10 without driving the load, that is, without causing input shaft 10 in FIG. 1 to become coupled to output flange 90. One example of such an occasion is during an active engine test and checkout. The output system, represented by main output member 90, is either stopped or running at some intermediate operating speed, driven by a parallel power source or other prime mover. Such avoidance of engagement with member 90 is accomplished, in the present design, by means of ring 40, which is designed to also function as a lock ring. To avoid engagement, the ring 40 is shifted to the right as viewed in FIGS. 1-5. Such shifting may be accomplished by means of an external lever and ring system which may be either hand actuated or which may be powered from a remote control. As will be seen from an examination of FIGS. 1-5, shifting of the lock ring 40 from the position shown in the drawings, to a position to the right thereof, will move the ratchet teeth 41 axially relative to the pawls 51. Thus, the ratchet teeth 41 will slide out from under the pawls 51 so that no engaging action can take place.

It will be seen, from FIGS. 1-5, that when lock ring 40 is shifted to the right, it is guided by spur splines 42 of the lock ring which maintain engagement with spur splines 35 of member 30. It will also be seen that spur splines 43 of the lock ring come into engagement with spur splines 14 of end member 15.

The locking action of ring 40 actually has two functions. One, as already described, is to prevent the main clutch from engaging, as during a test run of the engine without load. A second function is to lock the clutch into engagement so that it will not disengage when the torque on the main input shaft 10 drops to zero or reverses in direction. In brief, because of lock ring 40, lock-out occurs when the clutch is disengaged, either static or running; lock-in occurs when the clutch is engaged. In FIG. 1, the internal spur splines 42 are always in engagement with spur splines 35 of guide member 30. This engagement of spur splines 42 with spur splines 35 occurs in both the lock-out and lock-in positions of ring 40. Engagement of spur splines 43 of the lock ring with spur splines 14 of end member 15 occurs only in the lock-out position.

In other configurations of this same mechanism, the lock ring can be shifted in one direction for lock-in, and in another direction for lock-out. Still further, these functions may use separate shifting members.

Guide 30, which has the external spur splines 35 referred to above, has a larger diameter annular portion 34 having internal spur splines 31. The internal spur splines 31 are in engagement with external spur splines 21 of an axially movable carrier member 20, and the function of spur splines 31 is to guide carrier 20 in its axial movement.

Carrier 20 is shown as provided with internal helical splines 22 which are in engagement with external helical splines 82 of mounting sleeve 80 which is bolted, as by bolts 11, to the clutch input shaft 10. The function of bolts 11 is to secure the mounting sleeve 80 on input shaft 10. Mounting sleeve 80 is shown as having internal spur splines 81 which are in mesh with external spur splines 12 of the clutch input shaft 10. It is to be understood that input shaft 10 does not have to be splined. The mounting sleeve 80 could be keyed to the shaft 10, or could be integral therewith, or attached by flanges.

Carrier 20 is shown to be biased, to the right as viewed in FIGS. 1-5, by an annular array of plungers 25, one of which is visible in FIGS. 1-5. Internal springs 24, urge the ends of the plungers 25 into abutting positions against wall 33 of guide member 30. Biasing of carrier 20, as by spring-loaded plungers 25, is not essential to the clutch of the present invention except in those installations where the mechanism is subjected to tilting, as in the rolling and pitching of a ship, or where the mechanism is mounted in an inclined position. In such cases, the plungers 25 maintain carrier 20 in its intended position of dis-engagement and prevent unintended engagement. As a general rule, the springs desirable to bias the mechanism toward the disengaged position and prevent any possible contact of the engaging members. An annular shock absorber 36, biased to the right by oil pressure, provides cushioning for the carrier 20 as it moves into abutting relationship with wall 33 of guide member 30.

Carrier 20 is also provided with external helical splines 23 which are in engagement with internal helical splines 73 of an angular coupler 70.

Coupler 70 has a larger-diameter right end portion 72 which is equipped with external spur splines 71. When coupler 70 is shifted axially, to the left as viewed in FIG. 1, the external spur splines 71 are adapted to abut against, and then engage with, internal spur splines 61 of output sleeve or cup 60. Spur splines 71 of coupler 70 may be crowned and spur splines 61 of cup 60 may be chamferred for the purpose of facilitating engagement and reducing mis-alignment problems.

OPERATION

When the first main member, (input shaft 10) is not being driven, or is being driven rotationally at a speed slower than that at which the second main member, (output load flange 90) is being driven by its drive means, pilot clutch 50 is disengaged, as will be readily apparent by reference to FIG. 6. Under the conditions just described, output sleeve 60 and pilot-clutch ring 50 are moving rotationally clockwise relative to pilot clutch ring 40. For, as seen in FIG. 1, pilot-clutch ring 40 is connected to the first main member, i.e. input shaft 10. This connection may be traced from input shaft 10 to ring 40 through spur splines 12 and 81, mounting flange 80, helical splines 82 and 22, carrier 20, spur splines 21 and 31, guide 30, spur splines 35 and 42, to pilot clutch lock-ring 40.

When input shaft 10 is stationary, its components are also stationary. These components include, mounting sleeve 80, carrier 20, coupler 70, guide 30, and pilot-clutch lock-ring 40. It is assumed that the load is being driven rotationally by a second power source. As a result, output flange 90, sleeve 60 and pilot-clutch ring 50 are rotating at the speed of the load.

Figure 2:
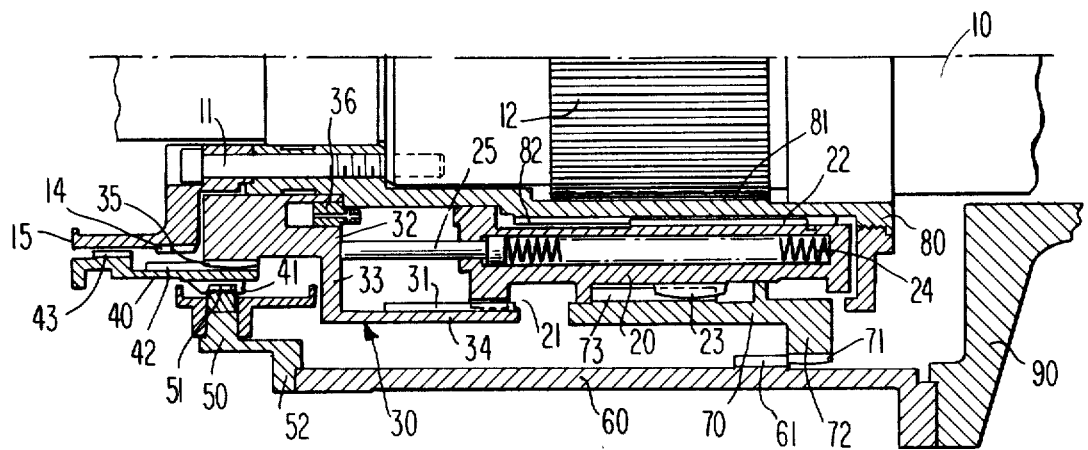
FIG. 2 is a view, similar to FIG. 1, showing the clutch moving toward engagement.

Assume now that the engine which drives input shaft 10 is started up. When this happens, the components 80, 20, 70, 30 and 40 all rotate at the speed of shaft 10. So long as the speed of input shaft 10 is less than the speed of the load, ring 50 moves clockwise relative to ring 40 as viewed in FIG. 6, and pawls 51 ride over the ratchet teeth 41, and no torque load is encountered. When, however, the rotational speed of shaft 10 attains and tends to pass the rotational speed of the load, as represented by output flange 90, the relative movement between ring 40 and ring 50 of the pilot clutch changes. Ring 40 now moves clockwise, as viewed in FIG. 6, relative to ring 50 and the ratchet teeth 41 engage the pawls 51. This places a torque load on ring 40, and this load is transmitted back to input shaft 10 through guide 30, carrier 20 and the helical splines 22, 82 which interconnect carrier member 20 and mounting sleeve 80. This torque load causes carrier 20 to shift on the helical splines 22, 82 relative to mounting sleeve 80. As a result carrier 20 moves axially, to the left as viewed in FIG. 1. Carrier 20 also shifts angularly. The axial movement is illustrated in FIG. 2.

Figure 3:
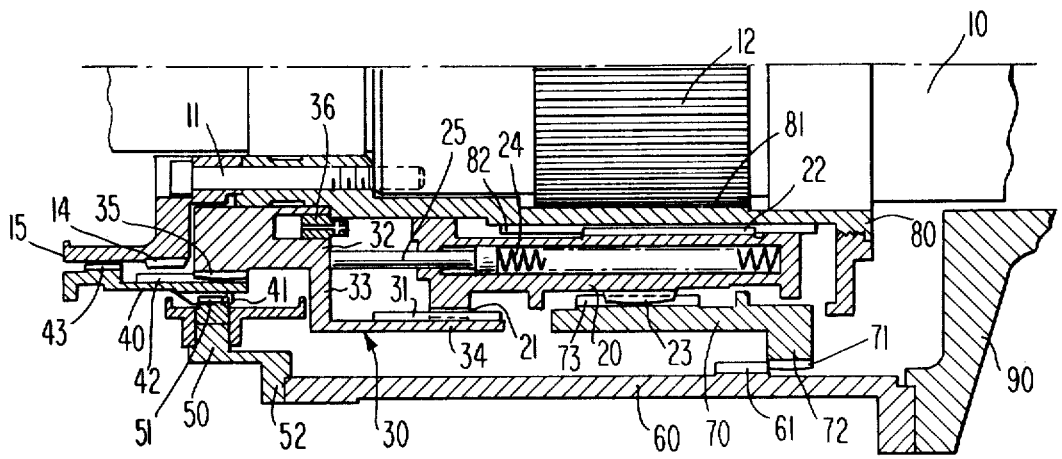
FIG. 3 is a view, similar to FIG. 2, showing further progress toward engagement.
Figure 4:
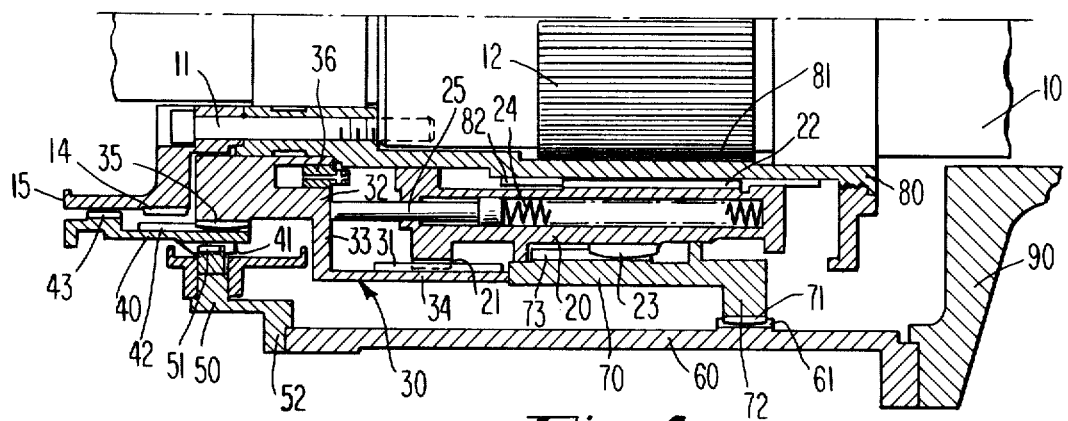
FIG. 4 is a view, similar to FIG. 3, showing the main clutch members coupled.
Figure 5:
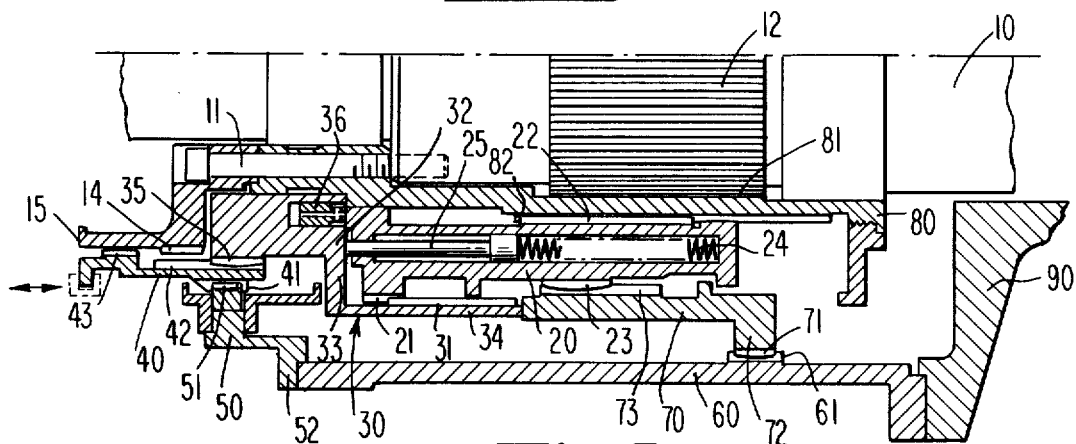
FIG. 5 is a view, similar to FIG. 4, showing the clutch in fully-engaged position.

When the carrier 20 shifts to the left, as just described, it carries along coupler 70 until the spur splines 71 of coupler 70 abut against the spur splines 61 of output cup 60. When this occurs, an axial load is imposed on coupler 70 which causes coupler 70 to shift on helical splines 73, 23 relative to carrier 20. As a result, carrier 20 moves axially to the left relative to coupler 70, as illustrated in FIG. 3, and coupler 70 moves angularly relative to spur splines 61 of the output cup 60. Only a very small angular movement is necessary to allow the crowned spur splines 71 to mesh with the chamferred spur splines 61. Thereafter, carrier 20 carries coupler 70 into mesh with cup 60 until the left end of coupler 70 abuts against the stop at the right end portion 34 of guide 30. This stop limits the axial movement of coupler 70 to the left. This condition is illustrated in FIG. 4. The carrier 20 continues, however to be shifted to the left on the helical splines 22, 82, until the left end of carrier 20 engages the shock absorber 36, depresses it, and abuts against the wall 33 of guide 30. This represents the fully engaged position and is illustrated in FIG. 5.

In the fully engaged position, the first main member, namely, input shaft 10, drives the second main member, namely, output flange 90, through spur splines 12, 81, mounting sleeve 80, helical splines 82, 22, carrier 20, helical splines 23, 73, coupler 70, spur splines 71, 61, and cup 60. It will be seen that pawls 51 and ratchet teeth 41 remain in their same positions. However, the torque load is removed from the pawl-and-ratchet elements.

It will be evident, from the description given above of the operation of the new clutch mechanism, that indexing is achieved by the helical splines 73, 23 and not by the pawl-and-ratchet elements. In the event the ratchet teeth 41 or the pawls 51 become worn, the operation of the device is not adversely affected, since the sole function of the pilot clutch is to provide the small torque which is necessary to move the sleeve 20 and coupler 70 along their respective helical splines into the lock-in position shown in FIG. 5.

In FIGS. 1-5 of the drawing, the carrier 20 is shown to be pre-loaded or biased into its disengaged or lock-out position, by compression springs 24 and plungers 25. As previously indicated, the biasing components 24 and 25 are not necessary to the basic mechanism but are desirable, as a practical matter, where the mechanism is installed in an inclined position, or on a ship which is subject to pitching and rolling. In such situation, the spring-biased plungers 25 function to prevent unintended engagement of spur splines 71 and 61.

If, after the clutch is fully engaged, as in FIG. 5, the rotational speed of the input shaft 10 whould decrease to a speed less then that of the output load, a change will take place in the relative motion of output flange 90 and input shaft 10. Shaft 10 will now move, clockwise in FIG. 6, at a slower rate then flange 90. Due to the direction of the torque load now imposed on carrier 20, the carrier will shift on the helical splines 22, 82. Thus, carrier 20 will move to the right. When carrier 20 so moves to the right, it carries coupling 70 with it. This action continues until spur splines 71 become disengaged from spur splines 61. Disengagement is maintained by spring 24 and plunger 25 but these elements are not essential to the disengaging action.

The self-synchronizing clutch of the present application is to be distinguished from self-synchronizing clutches of the prior art in which pawls perform the indexing function. In such prior art clutches, the pawls are driven through two helices, in series. In the mechanism of the present application, the pawls of the over-running clutch are driven through one helix only, namely, the helix which connects the carrier 20 to the mounting sleeve 80.

In the prior art clutches, the pawls are shifted axially out of the path of the ratchet ring. In the mechanism of the present application, the pawls are not shifted axially relative to the ratchet but unload as a function of complete carrier shifting after engagement of the coupling. In the present application, helical splines 73, 23 are employed to seek engagement with the load. Thus, engagement is not affected by wear on the pawls or on the load carrying teeth. This design permits the pawl-and-ratchet mechanism to be of light weight, since its only function is to shift carrier 20 without an added pilot clutch.

Figure 7:
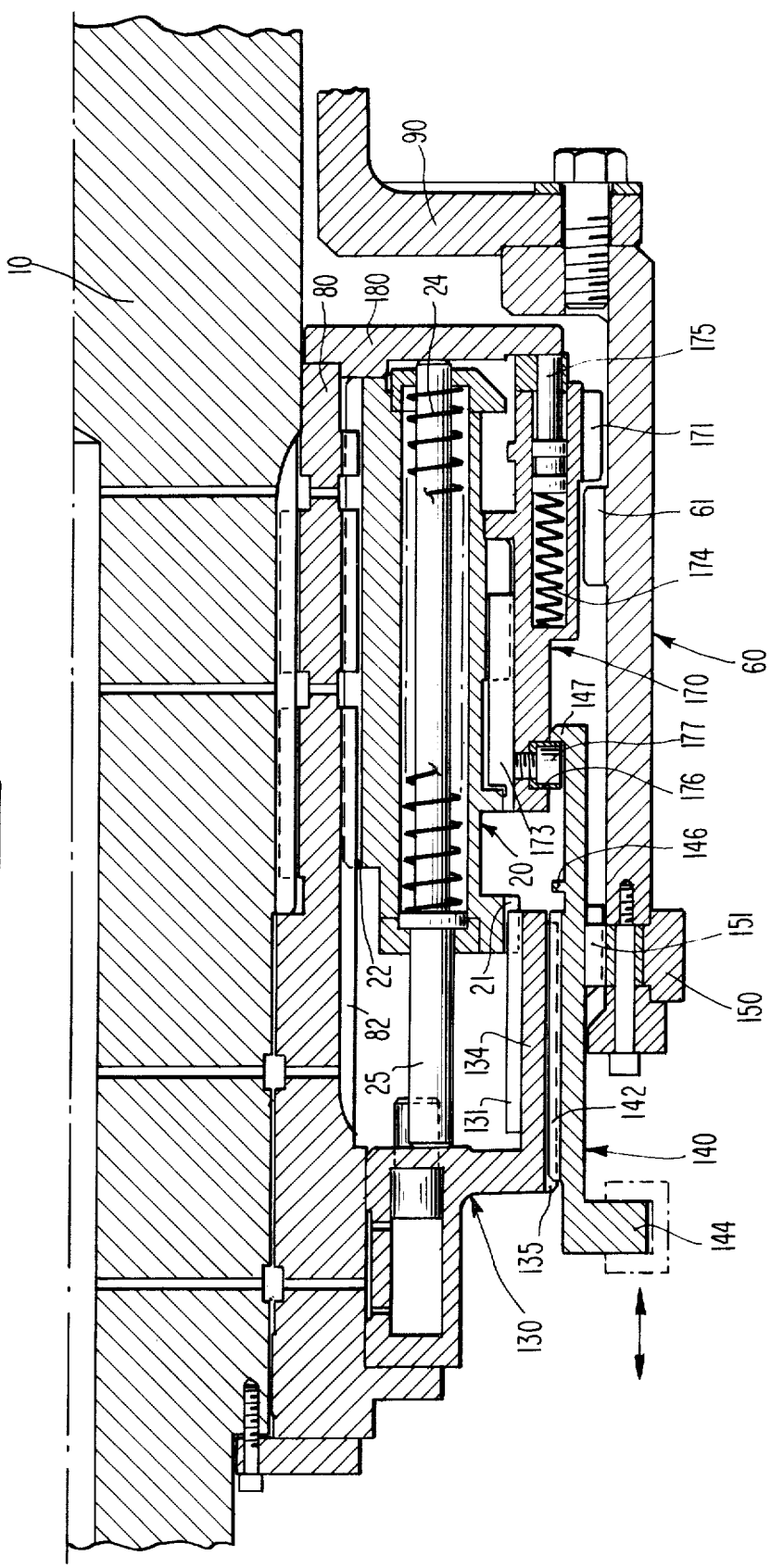
FIG. 7 is a view similar to FIG. 1 but showing a more compact presently preferred form of clutch mechanism.

While the form of clutch mechanism illustrated in FIGS. 1-5 embodies the basic features of a synchronizing clutch mechanism according to the present invention, a presently preferred form of clutch is illustrated in FIG. 7. The clutch mechanism illustrated in FIG. 7 is more compact than the one illustrated in FIGS. 1-5, and has the capability of being installed in a smaller housing.

The clutch mechanism of FIG. 7 is made more compact by relocating the locking ring and the pawl-and-ratchet mechanism closer to the carrier. As compared with FIGS. 1-5, the locking ring and pawl-and-ratchet mechanism have been moved to the right.

In FIG. 7, component parts which are similar to, but somewhat different from, those of FIGS. 1-5, have been identified by reference numerals to which 100 has been added. Thus, locking ring 40 in FIGS. 1-5, is locking ring 140 in FIG. 7; guide member 30 in FIGS. 1-5 is guide member 130 in FIG. 7; coupler 70 in FIGS. 1-5 is coupler 170 in FIG. 7, etc.

Spur splines 35 of guie members 30 of FIGS. 1-5 have been replaced by spur splines 135 which extend along the exterior surface of member 134, and spur splines 142 of locking ring 140 are in engagement with spur splines 135. Ring 50 of the pawl-and-ratchet mechanism has been replaced by ring 150 mounted on cup 60.

In FIG. 7, when the rotational speed of input shaft 10 attains and passes the speed of the load flange 90, a torque load is placed on ring 140 and this load is transmitted back to input shaft 10 through spur splines 142, 135, guide 130, spur splines 131, 21, carrier 20, helical splines 22, 82, and mounting sleeve 80. As in the embodiment of FIGS. 1-5, the torque load causes carrier 20 to shift on the helical splines 22, 82 relative to mounting sleeve 80. The action is the same as that of FIGS. 1-5.

The specific design of clutch mechanism illustrated in FIG. 7 includes several features which are not included in the form of clutch illustrated FIGS. 1-5.

A first additional feature is the provision of biasing means 174 and 175 for biasing the coupler 170 toward the left, as viewed in FIG. 7. Thus, if the mechanism is installed in a vertical or inclined position such that the coupler 170 would otherwise be urged by gravity to the right, the biasing means will maintain the spur splines 171 in engagement with spur splines 61 of cup 60 despite the gravitational forces. The means for biasing coupler 170 to the left, as viewed in FIG. 7, comprise a plurality of compression springs 174 and plungers 175 contained within a plurality of bores provided in the annular coupler. The noses of the plungers abut against an enlarged flange 180 secured to mounting sleeve 80. Spring 174 is made weaker than spring 24 which biases carrier 20 toward the right so that normally the spur splines 171 are maintained out of contact with spur splines 61 of cup 60.

A second additional feature which is included in the embodiment of FIG. 7 is the provision of an external indicator for indicating to an attendant whether the clutch is disengaged or fully engaged. This external indication is provided by end 144 of locking ring 140. Coupler 170 is provided with an annular member 176 which is secured to coupler 170 by a series of screws 177. Locking ring 140 is provided with an internal annular rib 146 so positioned that as coupler 170 is carried leftward toward fully engaged position, the annular member 176 will contact the annular rib 146 and shift the lock ring 140 leftward. This slight shifting of lock ring 140 is sensed by suitable means, indicated in phantom in FIG. 7, which is responsive to shifting of flange 144 to the right or to the left. When the clutch is shifted back to disengaged position, coupler 170 is shifted to its rightmost position and in doing the projecting annular member 176 of the coupler engages the flange 147 of lock ring 140 and returns it to the position shown in FIG. 7. By sensing the position of the flange 144 of lock ring 140, suitable indicators can display whether the clutch mechanism is engaged or disengaged.

In the design of FIGS. 1-5, the locking ring 40 is not shifted automatically by the coupler 70 but is movable manually or by external means, as indicated in phantom in FIG. 7, to either the lock-in or lock-out positions.

What is claimed is:

1. In a self-synchronizing clutch mechanism for automatically coupling rotatable input means to rotating output means in response to said input means attaining a rotational speed equal to that of said output means, and for automatically decoupling said input means from said output means in response to the rotational speed of said input means falling below that of said output means:
   a. an annular carrier mounted coaxially with said input means and coupled to said input means through a first set of helical splines;
   b. an annular coupler mounted coaxially with said carrier and carried by said carrier by means of a second set of helical splines;
   c. sensing means responsive to said input means attaining a rotational speed equal to that of said output means;
   d. carrier constraining means activated by said sensing means for guiding the combined rotational and axial movement of the carrier relative to the said output means, thereby to cause said carrier to move axially and angularly on said first set of helical splines in response to input torque;
   e. said coupler, when carried axially by said carrier, being adapted to abut against said output means and in response to said abutment to be moved angularly on said second set of helical splines and into engagement with said output means.

2. Apparatus according to claim 1 wherein:
   a. said sensing means is a one-way or over-running clutch.

3. Apparatus according to claim 2 wherein:
   a. said output means includes an annular member mounted essentially coaxially with said input means.
   b. said annular member is provided with toothed or keyed engagement means;
   c. said coupler is provided with mating toothed or keyed engagement means adapted to abut against and, after resultant angular movement, to engage with said engagement means on said output annular member.

4. Apparatus according to claim 3 wherein:
   a. said engagement means on said output annular member comprises internal splines;
   b. said engagement on the coupler comprises external splines.

5. Apparatus according to claim 3 wherein:
   a. said over-running clutch includes pawls and ratchet teeth mounted in concentric rings.

6. Apparatus according to claim 1 wherein:
   a. said constraining means comprises an annular guide mounted coaxially with the said input means.

7. Apparatus according to claim 6 wherein:
   a. said guide is provided with internal splines adapted to mesh with mating external splines provided on said carrier..

8. Apparatus according to claim 7 wherein:
   a. said output means includes an annular member mounted essentially coaxially with said input means.
   b. said annular member is provided with toothed or keyed engagement means;
   c. said coupler is provided with mating toothed or keyed engagement means adapted to abut against and, after resultant angular movement, to engage with said engagement means on said output annular member.

9. Apparatus according to claim 8 wherein:

a. said sensing means is a one-way or over-running clutch.

10. Apparatus according to claim 9 wherein:
a. said over-running clutch includes pawls and ratchet teeth;
b. said pawls are mounted on a ring which is connected with said output means.

11. Apparatus according to claim 10 wherein:
a. said ratchet teeth are on a lock-ring.
b. said lock-ring is coupled, by splines or keys, to said guide.

12. Apparatus according to claim 11 wherein:
a. said lock ring is provided with means to be moved by said coupler for shifting said lock ring axially;
b. said lock ring is provided with indicator means for indicating the engagement and dis-engagement conditions of said clutch mechanism.

13. Apparatus according to claim 11 wherein:
a. said lock ring with said ratchet teeth is provided with a means for axial movement such that the ratchet teeth are removed from engagement with the pawls.

14. Apparatus according to claim 1 wherein is provided:
a. a clutch lock-in means such that the said carrier constraining means is further constrained from relative angular motion with the input means, preventing axial shifting at the carrier, and thereby preventing the said annular coupling from disengaging with the output means regardless of the torque direction.

15. Apparatus according to claim 14 wherein:
a. said further constraining means comprises an annular member mounted coaxially with the said input means;
b. said lock-in means comprises an annular ring for interconnecting said carrier constraining means and said input means by splines or keys, and adapted to engage both when shifted axially.

16. Apparatus according to claim 1 wherein:
a. first biasing means are provided between said input means and said carrier for urging said carrier toward a position at which said coupler is out of engagement with said output means.

17. Apparatus according to claim 16 wherein:
a. second biasing means are provided between said input means and said coupler for urging said coupler toward a position at which said coupler is in engagement with said output means.
b. said second biasing means being adapted to exert a force greater than gravity but less than said first biasing means.

18. Apparatus according to claim 17 wherein:
a. said first biasing means includes a first array of spring-loaded plungers carried by said carrier;
b. said second biasing means includes a second array of spring-loaded plungers carried by said coupler.

19. Apparatus according to claim 1 wherein:
a. shock-absorber means are provided on said carrier constraining means for cushioning said carrier.

* * * * *